May 4, 1954 W. F. ALLER 2,677,269
GAUGING DEVICE FOR BEARINGS
Filed July 2, 1949 2 Sheets-Sheet 2
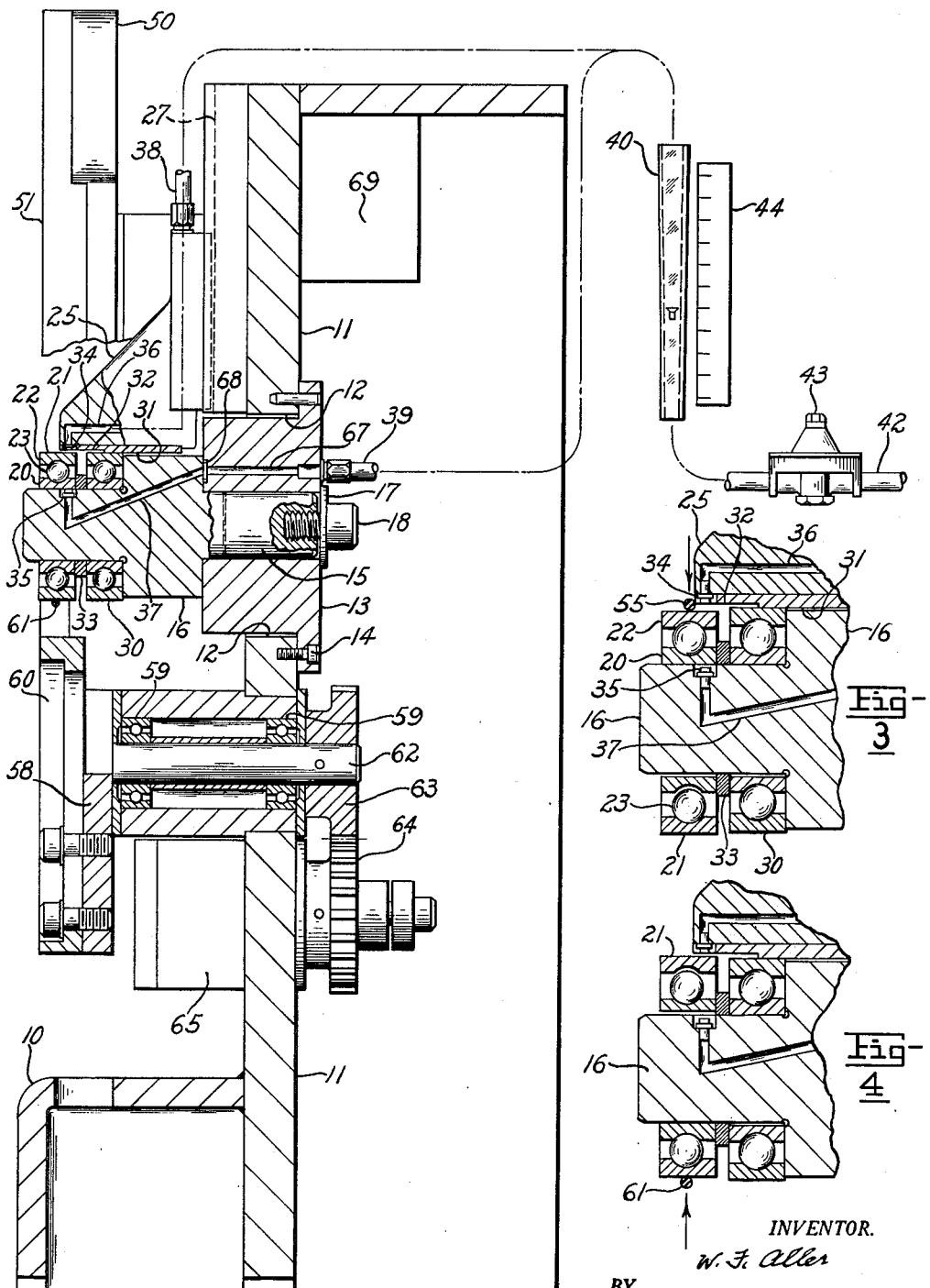
INVENTOR.
W. F. Aller
BY Edward T. Nor Jr.
atty Patented May 4, 1954

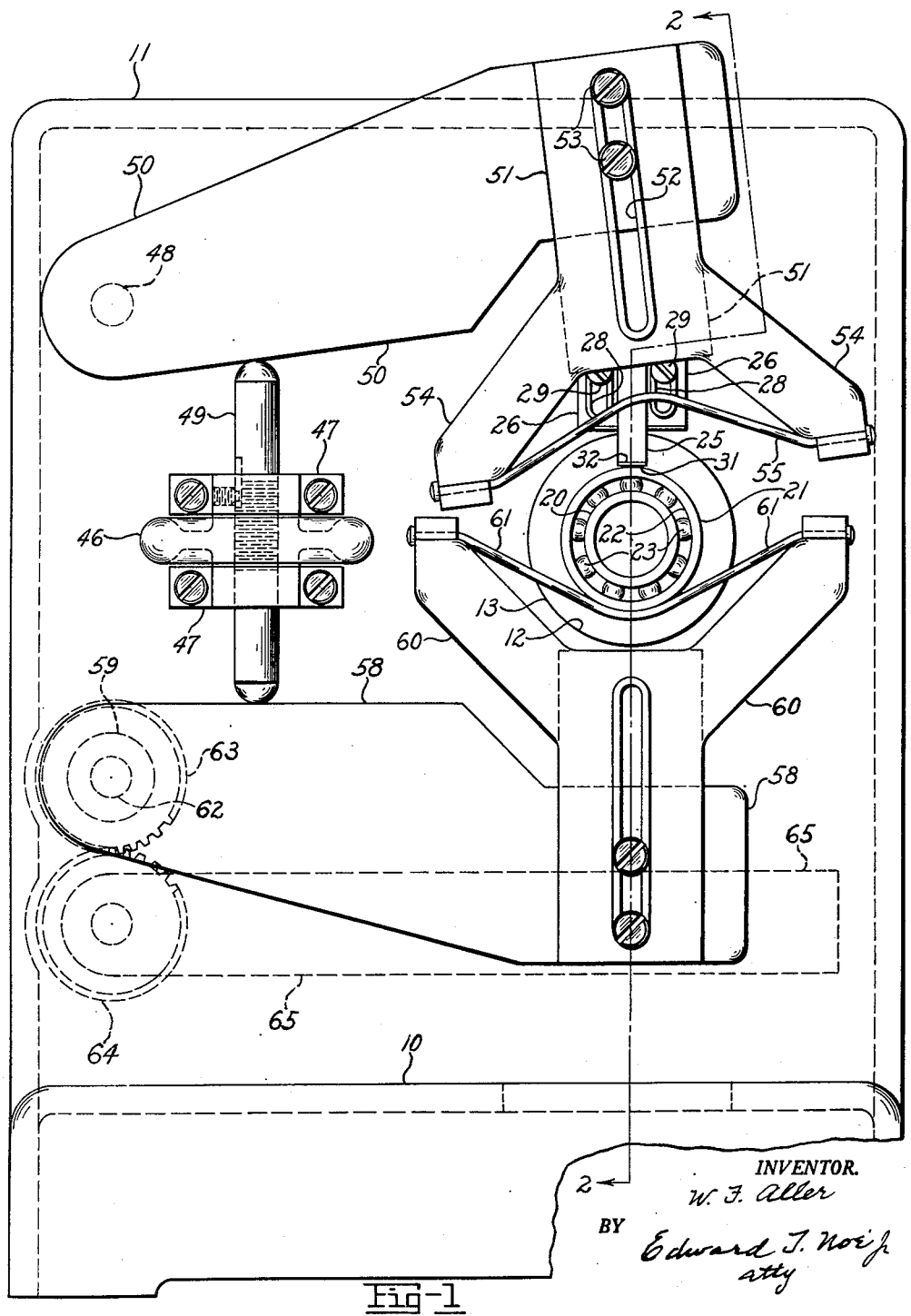

2,677,269

UNITED STATES PATENT OFFICE 2,677,269

GAUGING DEVICE FOR BEARINGS

Willis Fay Aller, Dayton, Ohio, assignor to The Sheffield Corporation, Dayton, Ohio, a corporation of Ohio Application July 2, 1949, Serial No. 102,760

14 Claims. (Cl. 73—37.5)

1

This invention relates to gauging devices and more particularly to devices for gauging the radial clearance between bearing races.

One object of the invention is the provision of a gauging apparatus for gauging radial clearance between the inner and outer races of an antifriction bearing in which there is a gauging device for measuring the distance between selected portions of the inner and the outer races and provision for taking up radial play at the gauging zone and at a location diametrically opposite the gauging zone without applying deforming pressure upon either of the races.

Another object is the provision of an antifriction bearing gauge having provision for applying radial forces on the bearing races to take up radial play at selected locations, the force applying means being of a yielding character so that the forces are annularly distributed over a substantial arc.

Another object is the provision of an antifriction bearing gauge for checking radial clearance in which the gauging devices effective on the inner and outer races operate without the application of pressure on the portions of the races gauged.

Another object resides in the method of gauging an antifriction bearing for radial clearance in which a predetermined radial compressive force is applied directly between the inner and outer races at a gauging zone at one side of the bearing axis and the direction of this force is then reversed to take up clearance at a point remote from the gauging zone without applying deforming forces on those parts of the bearing at the gauging zone, indications of the distance across the bearing races at the gauging zone being compared to determine the radial clearance.

More concisely the invention in the embodiment herein disclosed includes a supporting arbor for receiving an antifriction bearing and having an air passage terminating in a leakage nozzle which cooperates with the inner surface of the inner bearing race. Vertically spaced from the spindle is an adjustable member capable of radial adjustment to accommodate bearings of different sizes and also having an air passage terminating in a leakage nozzle that cooperates with the outer surface of the outer race, these two nozzles being associated with an air gauging device which is controlled in accordance with changes in the distance across the races at the gauging zone. The races are pressed together at the gauging zone to take up radial clearance at that point by a yielding member that applies a distributed force

2 in a generally radial direction of the outer race. This force is then reversed so that the play is taken up at a point diametrically opposite the gauging zone and the change in reading on the gauging device thus gives a measure of radial clearance present in the bearing.

With the above and other objects and advantages in view as will be apparent from the following description, the appended claims, and the accompanying drawing, reference is made to the drawing in which, Fig. 1 is a front elevational view of a gauging device embodying the present invention;

Fig. 2 is a vertical section on the line 2—2 of Fig. 1; and

Figs. 3 and 4 are enlarged sectional views showing the gauging action, clearance in the operating parts in the device being very much exaggerated for purpose of illustration.

Referring more particularly to the drawing, 10 designates the gauge base having an upstanding wall 11 provided with an opening 12. A holder 13 mounted in this opening is secured in place by attaching screws 14, the holder having a passage for receiving the end portion 15 of an arbor 16. Holding ring 17 and an attaching screw 18 threaded in the end of the arbor serve to mount the arbor securely in position but permits its removal so it may be replaced by other arbors adapted to antifriction bearings of other diameters.

The arbor 16 is adapted to receive the inner race 20 of an antifriction bearing 21 to be gauged, having an outer race 22 and a series of antifriction members 23 which are here shown in the form of balls. The diameter of the arbor 16 adjacent the gauging zone is such that an operating clearance is provided between it and the inner race so that the bearing 21 can be conveniently applied and removed.

On the wall 11 of the base and radially spaced from arbor 16 is a stationary member such as bracket 25 having side arms 26 which operate in guideways 27 in the wall 11 so that the member 25 can be readily adjusted with respect to the arbor axis in accordance with the maximum bearing diameter. The side arms 26 are slotted as shown at 28 and securing screws 29 threaded in the wall 11 hold the bracket 25 in its proper position in which it is slightly spaced from the outer race of the bearing to be gauged for radial clearance. The location of the member 25 is determined by means of a setting ring 30 carried by the arbor 16 adjacent the gauging zone. Preferably one of the bearings to be gauged is employed as a setting ring. The bracket 25 has a stop surface 31 that contacts with the upper side of the locating ring 30, the surface 31 being slightly offset from the surface 32 as shown in Fig. 3 so that when the operator adjusts the bracket for contact with the locating ring, the surface 32 will be slightly spaced from the outer race of the bearing to be gauged. A spacing plate 33 may be employed between the ring 30 and the bearing to be gauged to properly locate the axis of symmetry of the bearing.

The bracket 25 and the spindle 16 are provided with opposed gauging nozzles 34 and 35 adapted for cooperation with the outer surface of the outer race and the inner surface of the inner race at the gauging zone, as illustrated in Fig. 3. Passages 36 and 37 leading to the gauging nozzles communicate respectively with pipes or tubes 38 and 39 which are joined together and extend to a flow gauging device as represented by the tapered upwardly flaring tube 40 having a float movable along the length of the tube in accordance with the rate of flow taking place, the rate of flow being determined by the amount of clearance between the ends of the gauging nozzles and the adjacent portions of the bearing which limit that flow in accordance with the distance across the bearing races. Air under pressure is supplied from a supply tube 42 through a pressure regulating valve 43 and flows upwardly through the tube 40, the position that the float assumes being apparent from a graduated scale 44. The operator by noting the amount of change in the float level produced by changes in the distance across the outer and inner races at the gauging zone during the gauging operation can thus determine the amount of change in the distance gauged. The distance gauged with this embodiment of the invention is the distance at one side of the bearing axis between the outer surface of the outer race and the inner surface of the inner race at or slightly displaced axially from the plane of symmetry of the bearing. Any other suitable gauging device responsive to the amount of leakage taking place at the gauging nozzle may be used as the invention is not limited to the use of a gauging device of the particular type herein exemplified.

In a gauging operation, the operator first applies a force on the outer race to take up all bearing play at the gauging zone by turning a control wheel 46 which is held against axial movement by bearing members 47 carried by the wall 11. The wheel 46 is threaded on a nonrotatable adjusting screw 49 which acts against an arm 50 pivotably carried at 48 on the wall 11 to lower arm 50. On the arm 50 is a bracket 51 having a slot 52 that receives holding screws 53 threaded in the arm 50 and providing for relative adjustment to accommodate bearings of different diameter. The bracket 51 has spaced extensions 54 which support the ends of a flexible cable or strap 55 which is long enough, as shown in Fig. 1, so that it may extend partly around and accommodate itself to the outer race and apply a force in a generally radial and downward direction over an extended annular length on the outer race. The strap or cable 55 may be wide enough to extend across the race with a hole through which the gauging nozzle 34 extends although as shown in Fig. 3 it acts in the central plane of the bearing at one side of the nozzle 34. The weight of the arm 50 and the parts which it carries is such that a predetermined force is applied to the outer race when the adjusting screw 49 is entirely released from the arm 50, taking up all radial clearance or play in the bearing at the gauging zone. The operator notes the gauge reading obtained under these conditions and then turns the hand wheel 46 in the opposite direction so the adjusting screw 49 is screwed upwardly to release the cable 55 from the bearing, and in doing so the lower end of the screw 49 releases the gravity actuated arm 58 pivotably mounted on the wall 11 and carrying a bracket 60 which supports a cable 61 similar to the arm and cable arrangement previously described. The arm 58 is fixed to a shaft 62 which is rotatably supported in the bearing 59 and carries a gear 63 meshing with a gear 64 which is fixed to a weighted arm 65 of such size and weight as to apply an upward force on the cable 61 that is equal to the downward force applied by the arm 50 to the cable 55 when that arm is lowered.

When the cable 61 is applied to the lower side of the outer race as shown in Fig. 4, the bearing play is entirely taken up at the lower side of the bearing diametrically opposite the gauging zone and all of the play then exists at the gauging zone so that the amount of air leaking between the gauging nozzles and the adjacent portions of the inner and outer races at the gauging zone is reduced from the results obtained in the first gauging action previously described. The amount of this reduction is apparent to the operator merely by noting the amount of change in the float position. The scale 44 may be suitably calibrated so that the operator can determine the actual bearing clearance in thousandths or ten thousandths of an inch.

The base of the gauge is provided with a mechanical vibrator of any suitable character, preferably electrically driven so that during the gauging operation the wall 11 of the base may be rapidly vibrated to insure the centralization of the balls in the races. Such a vibrator is indicated at 69.

It should be especially noted that when the cable 61 is effective and play is taken up at a location opposite the gauging zone there is no upward nor downward pressure on either of the bearing races at the gauging zone itself so there is no tendency to cause an oval deformation of either one of the bearing races. The gauging device at the gauging zone operates without applying a gauging pressure on either of the races such as could ovally deform the races. With the axis of the bearing horizontal there is assurance that the balls will centralize themselves with the axis of symmetry of the bearing races. It should also be noted that the amount of clearance present between the inner race and the arbor 16 is immaterial since it is the actual distance between the outer surface of the outer race and the inner surface of the inner race at the gauging zone that is actually measured by the gauging devices, namely, the nozzles 34 and 35 which co-act directly with the two portions of the bearing between them.

It will be apparent that the gauging device may be conveniently adjusted for bearings of different sizes and diameters. For example if a bearing of larger diameter than the one shown is to be accommodated the arbor 16 is removed after first removing the screw 18 and is replaced by another arbor in which the bearing supporting portion is of the required diameter. All such arbors are provided with gauging nozzles and fluid passages similar to the nozzles 35 and 37 but in all of such arbors the terminal ends of the passages 37 are the same distance from the axis of the arbor so they will communicate with the end of the passage 67 in the holder 13, a suitable seal against leakage being effective between the ends of these passages by means of a rubber sealing ring 68. Having replaced the arbor, the operator then applies a locating ring 30 of the proper diameter, preferably using one of the bearings to be gauged and radially adjusts the position of the bracket 25 so that it contacts with the outer surface of the locating ring, then tightening the adjusting screws 29. He then applies one of the bearings to be gauged, applies the predetermined force on the outer race by lowering the cable 55, notes the reading of the float, then raises this cable and applies the cable 61 with the same force application and again notes the position of the float and determines the difference in float level which gives him the amount of radial clearance present.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gauging an antifriction bearing for radial clearance between an inner and an outer race comprising a support having a member fixed thereon for telescopically receiving one of the races for limited free radial play thereon during the gauging operation and adapted to hold said race with its axis substantially horizontal, the size of said support being such that the race received thereby has limited radial play thereon, means for applying a substantially radial force of a predetermined amount and in a substantially vertical direction on the other race, means to reverse the direction of force application, and means for gauging changes in the distance across the inner and outer races produced by changes in the direction of force application, said last means comprising a pair of adjacent air gauging nozzles in facing relationship in a gauging zone at one side of the race support, one on said support and one in said member and directly controlled by an outer side of the outer race and the inner side of the inner race, an indicator, and means operatively connecting said indicator to said gauging nozzles.

2. Apparatus for gauging an antifriction bearing for radial clearance between an inner and an outer race comprising an arbor for telescopically receiving the inner race with its axis substantially horizontal, the size of such arbor being such that the race received thereby has limited radial play thereon, means including a flexible member engageable with the outer race for applying an annularly distributed force towards the bearing center downwardly on the outer race, means including a flexible member engageable with the outer race for applying an annularly distributed force towards the bearing axis upwardly on the outer race, and means including gauging elements one directly controlled by the inner side of the inner race and the other directly controlled by the outer side of the outer race for gauging changes in the distance across the inner and outer races when the direction of force application to the outer race is changed.

3. Apparatus or gauging an antifriction bearing for radial clearance between an inner and an outer race comprising an arbor support for the inner race, a member radially spaced from said arbor support, means for applying an annularly distributed force of a predetermined value in one direction on the outer race in a substantially radial direction, means to reverse the direction of force application on the outer race, and a pair of opposed air gauging nozzles one on said support for direct control by the inner side of the inner race and the other on said member for direct control by the outer side of the outer race, the nozzle outlets being disposed in facing relationship and at a predetermined distance apart during a gauging operation, and means controlled by air flow through said nozzles for gauging changes in the distance between the inner surface of the inner race and the outer surface of the outer race caused by such force reversal.

4. Apparatus for gauging an antifriction bearing for radial clearance between an inner and an outer race comprising a support, an arbor rigidly mounted on said support for the inner race of a diameter less than the diameter of the inner race adapted to hold said race with its axis substantially horizontal, a member radially spaced from said arbor support, opposed air leakage gauging means on said arbor and on said member cooperating respectively with and controlled by an inner surface of the inner race and an outer surface of the outer race at the same side of the bearing axis, said member and its gauging means during a gauging operation being spaced from said arbor a predetermined distance in excess of the distance between the outer surface of the outer race and the inner surface of the inner race so as to avoid deforming pressure contact across the outer race, means for applying a predetermined force in a radial direction at the gauging zone on the outer race to take up bearing play at the gauging zone, means for releasing said force and applying an equal force in a reverse direction on the outer race at a location diametrically opposite the gauging zone, and a gauging device controlled by said gauging means.

5. Apparatus for gauging an antifriction bearing for radial clearance between an inner and an outer race comprising a spindle support for the inner race, a member spaced radially from said spindle and fixed in position during a gauging operation, said spindle and said member having passages terminating at a gauging zone in opposed gauging nozzles directly controlled by the inner surface of the inner race and the outer surface of the outer race, said gauging nozzles being disposed in facing relationship with a normal spacing apart greater than the spacing between the inner surface of the inner race and the outer surface of the outer race during a gauging operation so as to avoid pressure contact across said races, gauging means connected to said passages and responsive to the changes in the distance between said surfaces, means for applying a substantially radial force on the outer race to take up bearing play at the gauging zone and means for applying a substantially radial force on the outer race to take up play at a point substantially opposite the gauging zone.

6. Apparatus for gauging an antifriction bearing for radial clearance between an inner and an outer race comprising a spindle support for the inner race, an adjustable member adapted for adjustment radially to fixed positions with respect to said spindle, said spindle and said member having passages terminating at a gauging zone at one side of the bearing axis in facing nozzles directly controlled by the inner surface of the inner race and the outer surface of the outer race, gauging means connected to said passages and responsive to changes in the distance between said surfaces, means for applying a substantially radial force on the outer race to take up bearing play at the gauging zone and means for applying a substantially radial force on the outer race to take up play at a point substantially opposite the gauging zone.

7. Apparatus as set forth in claim 6 in which said force applying means are yielding members having yielding contact over annularly extended portions of the outer race.

8. Apparatus as set forth in claim 6 in which said spindle is provided with a readily removable locating ring adjacent the gauging zone for locating the adjustable member with respect to the spindle.

9. Apparatus for gauging the clearance relationship of a pair of inner and outer mating parts comprising a support having means for carrying one of the parts for limited free radial play thereon during gauging, means for applying a force in one direction on the other of said parts towards the said one part and including means for reversing the direction of force application, a pair of opposed spaced gauging fluid leakage nozzles at a gauging zone at one side of said parts and provided on said support in position for direct control by and cooperation respectively with the inner portion of the inner part and the outer portion of the outer part and adapted for connection to a fluid flow responsive device, said nozzles being spaced apart a predetermined distance during a gauging operation so as to avoid deforming pressure contact across the parts.

10. Apparatus for gauging the clearance relationship of a pair of cooperating coaxial parts comprising a support having means for carrying one of the parts, means for applying force in one direction on the other of said parts towards said one part and including means for reversing the direction of force application, and a pair of spaced gauging fluid leakage nozzles provided on said support in position for cooperation respectively with opposite portions of said parts and adapted for connection to a fluid flow responsive device, said nozzles being arranged in facing relationship a fixed distance apart during a gauging operation and at a gauging zone at the same side of the axes of said parts and in line with the direction of force application.

11. Apparatus for gauging the clearance relationship of an inner bearing ring and an outer bearing ring comprising a support having a rigid carrying spindle fixed thereon for telescopically loosely receiving the inner bearing ring, means for applying a force directed radially on the outer ring including means for reversing the direction of force application and a pair of spaced gauging fluid leakage nozzles one of which is provided on said support in a position for direct cooperation with and control by the outer side of the outer ring and the other provided in said spindle in position for direct cooperation with and control by the inner side of the inner ring and with said nozzles arranged in line with the direction of force application at one side of the rotation axis of the bearing rings, said nozzles being adapted for connection to a fluid flow responsive device for gauging the changes in the distance between the rings at one side of the axis caused by force reversal.

12. Apparatus for gauging the clearance relationship of a pair of inner and outer mating parts comprising a support having means for carrying one of the parts, means for applying a force in one direction on the other of said parts towards the said one part and including means for reversing the direction of force application, said force applying means comprising yielding members having a yielding contact over extended portions of the other of said parts, a pair of opposed spaced gauging fluid leakage nozzles at a gauging zone at one side of said part and provided on said support in position for direct control by the inner portion of the inner part and the outer portion of the outer part and adapted for connection to a fluid flow responsive device.

13. Apparatus for gauging an antifriction bearing for radial clearance between an inner and outer race comprising an arbor for telescopically receiving the inner race, a pair of arms carried for pivoting movement about axes parallel to the axis of said arbor, a first of said arms carrying means for engaging the outer race and applying force toward the bearing center in a given direction, a second of said arms carrying means for engaging the outer race and applying force toward the bearing center and in the opposite direction, means operatively connected with said arms for actuation thereof and application of the force in alternative reverse directions, and means including gauging elements in a gauging zone at one side of the bearing axis and in the line of direction of force application, one directly controlled by the inner side of the inner race and the other directly controlled by the outer side of the outer race for gauging changes in the distance across the inner and outer races when the direction of force application to the outer race is changed.

14. Apparatus for gauging the clearance relationship of a pair of cooperating coaxial parts comprising a base having a spindle support for the inner part, an adjustable member carried on said base for adjustment to fixed radial positions with respect to said spindle, said spindle and member carrying opposing gauging elements facing one another across a gauging zone at one side of the spindle axis for cooperation with the inner surface of the inner part and the outer surface of the outer part, a removable locating part on said spindle, said radially adjustable member having a locating surface for engagement with said locating part to determine its radially adjusted position, the member carried gauging element being disposed radially outward of said locating surface, means for applying a substantially radial force on the outer part to take up play between the parts at the gauging zone and means for applying a substantially radial force on the outer part to take up play at a point substantially opposite the gauging zone.

References Cited in the file of this patent

UNITED STATES PATENTS

| Number | Name | Date |
|---|---|---|
| 1,062,566 | Gohlke | May 20, 1913 |
| 2,419,280 | Neff | Apr. 22, 1947 |
| 2,431,014 | Aller | Nov. 18, 1947 |
| 2,468,875 | Henrikson | May 3, 1949 |
| 2,525,068 | Ericson et al. | Oct. 10, 1950 |
| 2,636,379 | Van Dorn | Apr. 28, 1953 |